United States Patent
Wang

(10) Patent No.: US 8,020,588 B2
(45) Date of Patent: Sep. 20, 2011

(54) TIRE REPAIR SOLUTION CAN

(76) Inventor: Min-Hsieng Wang, Taipei (TW)

( * ) Notice: Subject to any disclaimer, the term of this patent is extended or adjusted under 35 U.S.C. 154(b) by 549 days.

(21) Appl. No.: 12/208,349

(22) Filed: Sep. 11, 2008

(65) Prior Publication Data

US 2010/0059143 A1 Mar. 11, 2010

(51) Int. Cl.
*B65B 31/00* (2006.01)
*B29C 73/18* (2006.01)

(52) U.S. Cl. ............. 141/38; 141/9; 141/100; 141/105; 152/502; 152/509

(58) Field of Classification Search ............. 141/9, 38, 141/98, 100–105; 152/502, 509, 415
See application file for complete search history.

(56) References Cited

U.S. PATENT DOCUMENTS

| | | | |
|---|---|---|---|
| 6,019,145 A * | 2/2000 | Savidge | 141/38 |
| 6,176,285 B1 * | 1/2001 | Gerresheim et al. | 152/509 |
| 6,431,225 B1 * | 8/2002 | Dudley | 141/38 |
| 6,889,723 B2 * | 5/2005 | Gerresheim et al. | 141/38 |
| 6,968,869 B2 * | 11/2005 | Eckhardt | 141/38 |
| 7,028,720 B2 * | 4/2006 | Eckhardt | 141/38 |
| 7,789,110 B2 * | 9/2010 | Marini | 141/38 |
| 7,798,183 B2 * | 9/2010 | Cegelski et al. | 141/38 |
| 7,854,242 B2 * | 12/2010 | Stehle | 141/38 |
| 2009/0107578 A1 * | 4/2009 | Trachtenberg et al. | 141/5 |

* cited by examiner

*Primary Examiner* — Timothy L Maust

(57) ABSTRACT

A tire repair solution can includes a body and a cap closed on the body. The cap is provided with an intake, an outlet, and a guide tube extending from the underside of an intermediate portion into the body. Then an exterior tube is connected with the intake and also with an air compressor. A one-way air valve is fitted in the intake, and the guide tube has a through hole in its wall, and a slide block is fitted on the through hole to close it up. The outlet has a back-pressure valve fitted inside, and is connected with a connect tube for connecting with a joint to be connected with an air valve of a tire. Then the tire repair solution can is possible to be used in a normal position and in an inverted position, convenient to operate and saving time and labor largely.

1 Claim, 5 Drawing Sheets

TIRE REPAIR SOLUTION CAN

BACKGROUND OF THE INVENTION

1. Field of the Invention

This invention relates to a tire repair solution can, particularly to one usable to be stand normally or inversely, with its repair solution to be pumped into a tire by means of an air compressor, possible to save time and labor as well. In addition, a spare one-way air valve and its tool are stored on a cap for convenience of operation.

2. Description of the Prior Art

A conventional automatic tire repair solution is applied to various types of vehicle tires, having a function of preventive and automatic tire repair. However, in using a spray-mode tire repair solution, a nozzle of a solution can is connected to the air valve of a tire, and then the solution is pumped into the tire to be repaired by compressing repeatedly the nozzle. But in compressing with a finger, its manual force is not strong, so the solution to be pumped into the tire may not be enough for repairing, far from achieving actual repair to the tire. Moreover, the solution can is commonly impossible to be inverted in use, so if the air valve is not properly situated, it is impossible to perform repair.

SUMMARY OF THE INVENTION

The purpose of the invention is to offer a tire repair solution can usable in a normal position and an inverted position, in conjunction with an air compressor for forcefully pushing tire repair solution into a tire to be repaired with time and labor saved largely.

Another purpose of the invention is to offer a tire repair solution can having a spare one-way air valve and its tool for taking place a one-way air valve fitted in an intake of a can body in case of out of order.

The feature of the invention is a body provided with a hole and a cap combined with the hole. The cap is provided with an intake, an outlet, a guide tube extending from the underside into an interior of the body. Further a suction tube is connected with a lower end of the guide tube in the body, and an exterior tube is connected to the intake and an air compressor at the same time. The intake has a one-way air valve fitted in, and the guided tube has a hole in its wall and closed by a slide block fitted on the hole. The outlet has a back-pressure valve fitted in. Thus, the air compressor can forcefully push compressed air through the intake and then into the body so that tire repair solution in the body may be forced to flow through an air valve of a tire by the compressed air for repairing the tire. Further the slide block is possible to slide down to open the through hole for the repair solution to flow through and then out of the outlet to finally into a tire to be repaired in case the tire repair solution can is inverted for use.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
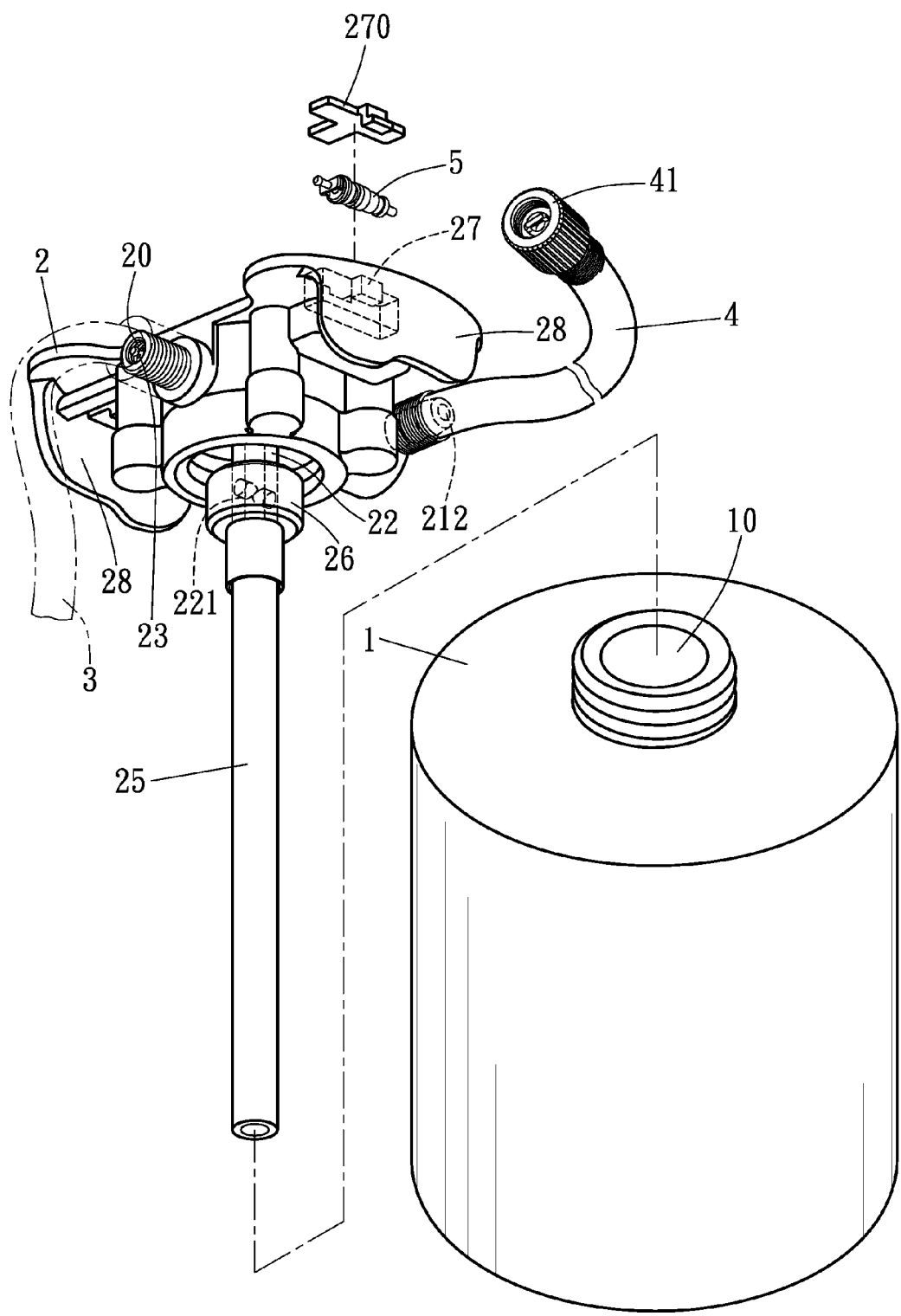
FIG. 1 is an exploded perspective view of a tire repair solution can in the present invention.
Figure 2:
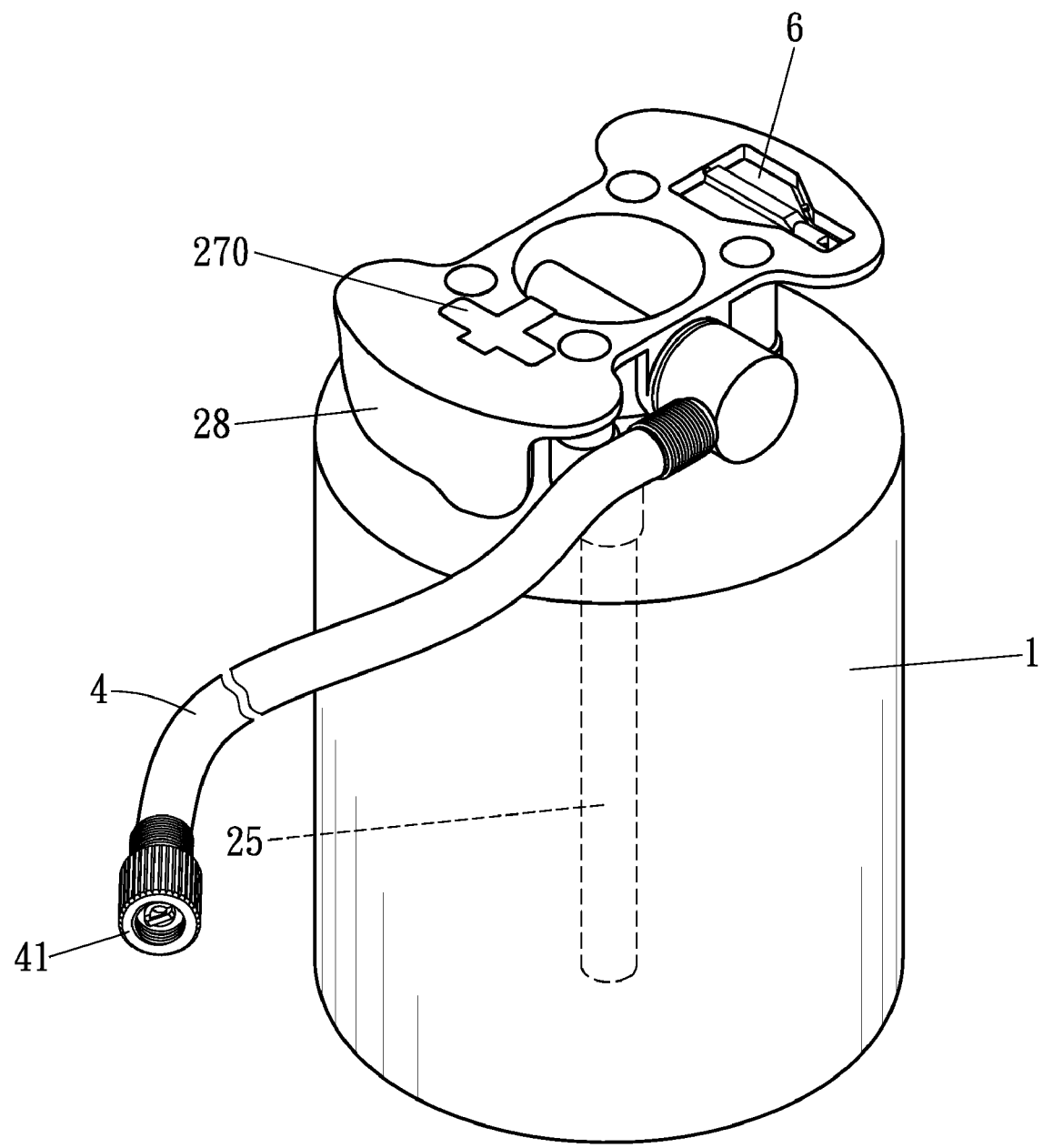
FIG. 2 is a perspective view of the tire repair solution can in the present invention.
Figure 3:
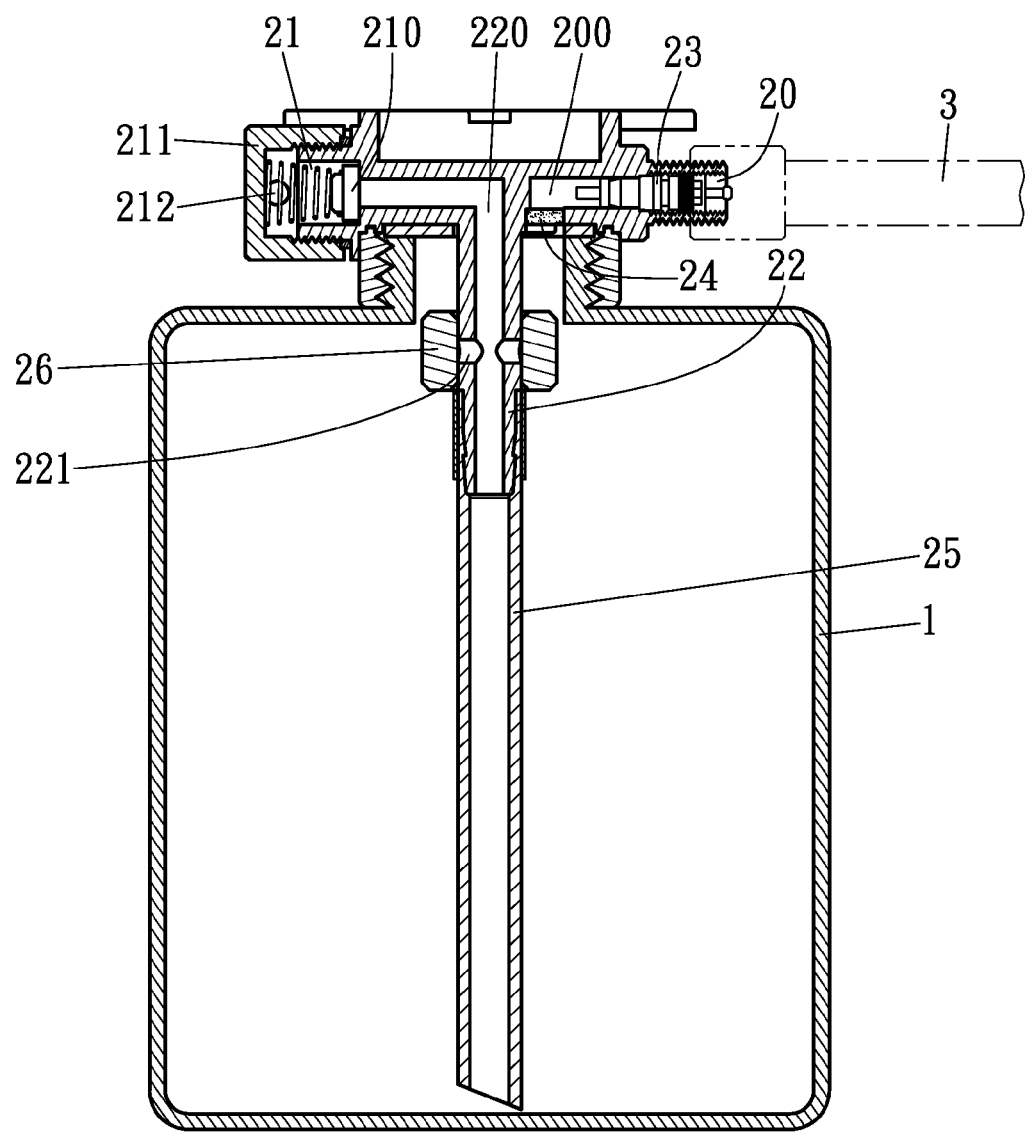
FIG. 3 is a cross-sectional view of the tire repair solution can in the present invention.

A tire repair solution can in the present invention, as shown in FIGS. 1, 2 and 3, includes a body 1, and cap 2 as main components.

The body 1 is provided with a hole in an upper side for combining with the cap 2.

The cap 2 is provided with an intake 20 at the front end, an outlet 21 formed at a rear end, a guide tube 22 extending down from an intermediate portion into the interior of the body 1. Then an exterior tube 3 is connected with the intake 20 at one end and also connected with an air compressor at the other end so that compressed air may be forced to flow into the body 1. An inlet air passage 200 is formed to communicate with both the intake 20 and the interior of the body 1, having its outer end connected with a one-way air valve 23 and its inner end provided with a stop block 24. The guide tube 22 has a guide passageway 220 and a hole 221 formed in an intermediate wall and closed up by a slide block 26 fitted closely thereon. Further, a back-pressure valve 210 is tightly fitted in the outlet 21, with a valve cap 211 covered on the outer surface of the back-pressure valve 210. The valve cap 211 has a flow hole 212 to be connected with a connect tube 4, which has its end assembled with a joint 41. Then the joint 41 can be connected to an air valve of a tire so that the tire repair solution in the body 1 may flow into a tire to be repaired by means of the air compressor.

Moreover, the cap 2 is provided with a recess 27 in the upper surface for receiving a spare one-way air valve 5, and an upper cap 270 is covered on the recess 27 with the one-way air valve 5. Further, an air valve tool 6 is attached at one side of the cap 2 for releasing the one-way air valve 23 in case of out of order, and a stop plate 28 is fixed at a side of the cap 2 for the connect tube 4 to be positioned after the connect tube 4 is wound around the cap 2.

Figure 4:
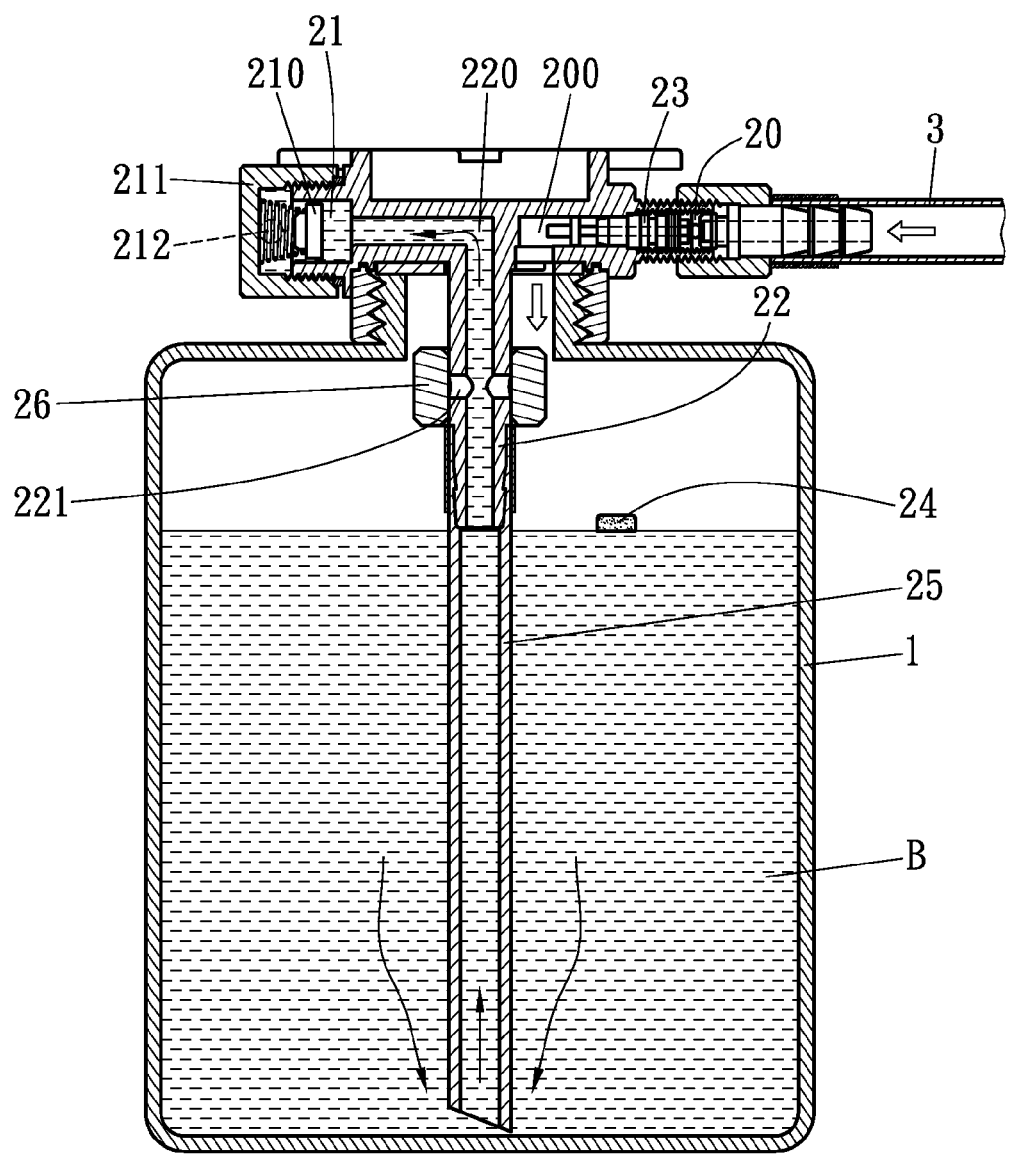
FIG. 4 is a cross-sectional view of the tire repair solution can in the present invention, showing it in a first operating condition; and, FIG. 5 is a cross-sectional view of the tire repair solution can in the present invention, showing it in a second operating condition.

In using, referring to FIG. 4, when a tire is found to leak, the exterior tube 3 connected with the inlet 20 of the cap 2 is connected with an air compressor, and then the connect tube 4 connected to the outlet 21 is connected to the air valve of the tire. Then the air compressor is started to send compressed air into the body 1, and the compressed air flows through the inlet 20 and the one-way air valve 23 into the inlet air passageway 200, forcing open the stop block 24 to move into the interior of the body 1. Then the air repair solution (B) in the body 1 gives rise to foaming and flows through the suction tube 25 into guide tube 22, pushing open the back-pressure valve 210 to flow through the flow hole 212 of the outlet 21 into the connect tube 4 and then into the tire to block up the leak point of the tire.

Figure 5:
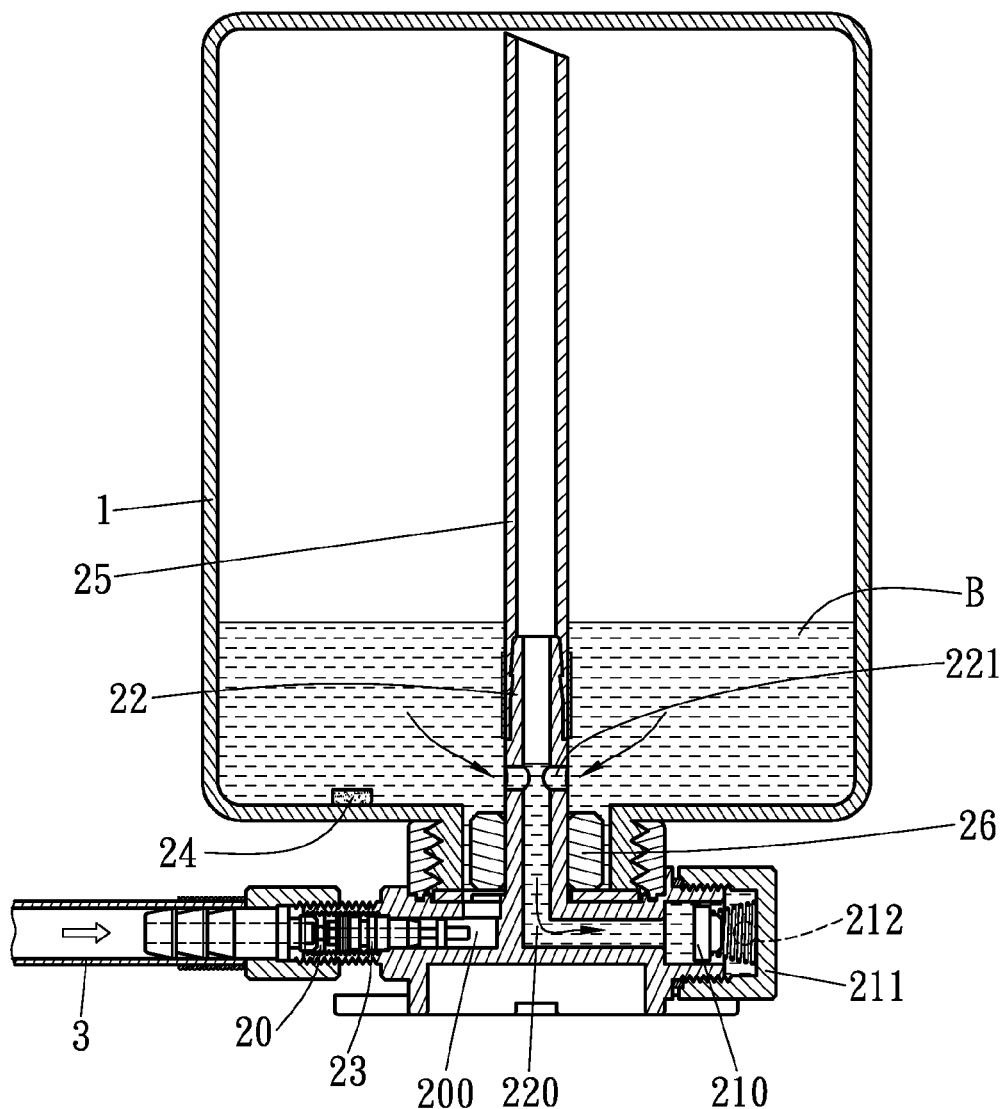

In addition, FIG. 5 shows the tire repair solution can is used in the inversed condition, with the slide block 26 sliding down along the guide tube 22 to let the hole 221 not closed by the slide block 26, so the tire repair solution (B) may flow through the hole 221 into the flow passageway 220, and finally into the tire.

As to the air valve tool 6, it is used for taking off the one-way air valve 23 from the intake 20 with easiness, and the spare one-way air valve 5 can take place of the one-way air valve 23 in case of out of order.

The tire repair solution can in the invention has the following advantages as can be seen from the foresaid description.

1. The can body 1 can be positioned normally or inversely. In the normal position, the repair solution flows through the guide tube 22 into a tire, while in the inverted position, it flow from the hole 221 into the flow passageway 220 and then into the tire, by means of an air compressor forcefully pushing the repair solution (B) into a tire with the time and labor saved largely.

2. A spare one-way air valve 5 and its tool 6 are attached with the cap 2 for replacing the one-way air valve 23 when the one-way air valve 23 is lost or destroyed.

While the preferred embodiment of the invention has been described above, it will be recognized and understood that various modifications may be made therein and the appended claims are intended to cover all such modifications that may fall into the spirit and scope of the invention.

What is claimed is:

1. A tire repair solution can comprising:

a body provided with a hole in an upper side;

a cap combined with said hole of said body, said cap provided with an intake formed in a front end and an outlet formed in a rear end, a guide tube extending from an underside of an intermediate portion of said cap into an interior of said body, a suction tube connected downward with a lower end of said guide tube, an exterior tube connected with said intake and then connected with an air compressor, a one-way air valve fitted in said intake, said guide tube having a through hole in a wall of an intermediate portion, a slide block fitted on said through hole of said guide tube for closing said through hole, a back-pressure valve fitted tightly in said outlet, a connect tube connected with said outlet for connecting a joint with its end so that said joint may be connected with an air valve of a tire; and wherein said cap is further provided with a recess in an upper surface for containing a spare one-way air valve therein, an upper cover is closed on said recess, and an air valve tool is releasably attached with a side of an upper surface of said cap.

\* \* \* \* \*